(12) United States Patent
Shanley, IV et al.

(10) Patent No.: US 9,579,842 B2
(45) Date of Patent: Feb. 28, 2017

(54) ADDITIONAL APPARATUS AND METHODS FOR SELECTIVE THERMOFORMING

(75) Inventors: William C. Shanley, IV, Malvern, PA (US); Michael R. Eyler, Jr., Mickleton, NJ (US); Robert L. Browning, Atlanta, GA (US)

(73) Assignee: William C. Shanley, IV, Malvern, PA (US)

( * ) Notice: Subject to any disclaimer, the term of this patent is extended or adjusted under 35 U.S.C. 154(b) by 1144 days.

(21) Appl. No.: 13/596,087

(22) Filed: Aug. 28, 2012

(65) Prior Publication Data

US 2013/0200551 A1 Aug. 8, 2013

Related U.S. Application Data

(60) Provisional application No. 61/633,024, filed on Feb. 3, 2012.

(51) Int. Cl.
*B29C 51/42* (2006.01)
*B29C 51/10* (2006.01)
(Continued)

(52) U.S. Cl.
CPC ............ *B29C 51/422* (2013.01); *B29C 51/10* (2013.01); *B29C 51/262* (2013.01); *B29C 51/36* (2013.01); *B29C 51/44* (2013.01)

(58) Field of Classification Search
CPC .................................................... B29C 51/422
See application file for complete search history.

(56) References Cited

U.S. PATENT DOCUMENTS 3,217,462 A 11/1965 Watts, Jr.
4,281,502 A 8/1981 Bonkowski
(Continued)

FOREIGN PATENT DOCUMENTS

CH 592953 11/1977
EP 055082 6/1982
(Continued)

OTHER PUBLICATIONS

International Search Report and Written Opinion dated Jun. 24, 2013 in Application No. PCT/US2013/023538.
(Continued)

*Primary Examiner* — Larry Thrower
(74) *Attorney, Agent, or Firm* — Kilpatrick Townsend & Stockton LLP; Dean W. Russell

(57) ABSTRACT

Thermoforming apparatus and methods are described. To-be-formed polymeric material may be separated initially from a mold surface by a grid or support rail, avoiding the mold surface from drawing heat away from the material while it is being heated to forming temperatures. The grid may retract into the mold when no longer needed to support the material. Plugs or inserts about which material is formed may include skirts, allowing the formed material to be shaped so as to guide coins or other objects into cavities in which the coins or objects are held for presentation or display. Profile plates associated with the molds may include non-stick material on their sides intended to abut to-be-formed polymeric sheets in order to reduce possibility of transfer of printing from the sheets to the plates and reduce undesired transfer of heat from the plates to the sheets.

9 Claims, 8 Drawing Sheets

(51) Int. Cl.
  *B29C 51/26* (2006.01)
  *B29C 51/36* (2006.01)
  *B29C 51/44* (2006.01)

(56) References Cited

U.S. PATENT DOCUMENTS

| | | |
|---|---|---|
| 4,878,826 A | 11/1989 | Wendt |
| 5,237,796 A * | 8/1993 | Bonkowski ............ B29B 13/023 53/398 |
| 2007/0065642 A1 | 3/2007 | Gupta et al. |
| 2011/0290674 A1* | 12/2011 | Shanley, IV ............ B29C 51/10 206/0.8 |
| 2011/0294087 A1 | 12/2011 | Gertitschke |

FOREIGN PATENT DOCUMENTS

| | | |
|---|---|---|
| GB | 784503 | 10/1957 |
| WO | 2012052892 A1 | 4/2011 |

OTHER PUBLICATIONS

PCT/US2013/023538, International Preliminary Report on Patentability dated Aug. 14, 2014, 9 pages.

\* cited by examiner

ADDITIONAL APPARATUS AND METHODS FOR SELECTIVE THERMOFORMING

CROSS-REFERENCE TO RELATED APPLICATION

This application claims the benefit of and priority to U.S. Provisional Patent Application Ser. No. 61/633,024, filed Feb. 3, 2012, entitled "New Alternative Selective Thermoforming Process Variation," the entire contents of which are incorporated herein by this reference.

FIELD OF THE INVENTION

This invention relates principally to improved apparatus and methods for shaping heated polymeric materials in a mold and more particularly, although not necessarily exclusively, to enhancements in selective thermoforming and to the products created thereby.

BACKGROUND OF THE INVENTION

U.S. Patent Application Publication No. 2011/0290674 of Shanley, IV, whose contents are incorporated herein in their entirety by this reference, discloses innovative apparatus and methods for heating selected areas of materials to forming temperatures while not forming other areas of the materials (i.e. "selective" thermoforming). As noted in the Shanley, IV application, one of many benefits of this selective thermoforming is that "unformed portions of the material remain substantially undistorted and thus may contain undistorted printing, art work, or other text, symbols, or information without concern as to whether intelligibility of the information will be degraded during the forming process." See Shanley, IV, p. 1, ¶ 0006. Such benefits are difficult to achieve, however, as multiple issues may disrupt the consistency of the thermoforming process.

The apparatus and methods of the Shanley, IV application resolve many of these issues and function well for their intended purposes. Enhancements nevertheless may be desirable in order to improve the apparatus and methods and the products created thereby. At least some of these enhancements advantageously could avoid premature physical contact between polymeric material and a corresponding mold surface, reducing the ability of the mold surface to function as an undesired heat sink by drawing heat from the polymeric material.

Also as noted in the Shanley, IV application, plastic display holders for coins or souvenirs are among products producible using selective thermoforming techniques. Thermoformed cavities into which coins or souvenirs are inserted for display beneficially may be resized or reshaped (or both) for improved presentation of the objects. Yet additionally, the plates, or heat sinks, of the Shanley, IV application may be modified for improved operation.

SUMMARY OF THE INVENTION

The present invention provides multiple improvements to the apparatus and methods disclosed in the Shanley, IV application. In at least some versions of the invention, polymeric materials may be separated initially from a mold surface by a spacing device in the form of a grid or support rail. The grid may support a sheet of polymeric material a substantially uniform distance from the mold surface while enabling a profile plate to block heat or other energy from an energy source as needed to effect the selective thermoforming. The grid further may be supported by springs or other biasing mechanisms and accepted by a receiver groove or recesses in the mold. When compressed by vacuum pressure and the force of the clamps, the grid may retract flush into the mold.

If alignment pins are present on a (typically) generally planar upper surface of a mold, springs may be positioned about at least some (and preferably all) of these pins. The grid may include plural open areas corresponding to the size and shape of the object being thermoformed and be placed so as to rest on the springs. Holes corresponding to positions of the alignment pins may be created in a flat, unformed sheet of polymeric material and the material laid atop the grid, so that the pins protrude through the material. Perimeter edges of the material may then be clamped, so that the to-be-formed material is positioned near—but not in contact with—the upper surface of the mold.

Energy sinks such as profile plates with cut-outs similar to the heat sinks of the Shanley, IV application also may be employed in connection with the present invention. Like the polymeric sheets, the profile plates may include recesses corresponding in position to the alignment pins of the mold. Unlike the sheets, however, the recesses of the profile plates preferably are not through-holes; consequently, a profile plate may rest atop the alignment pins once they are inserted into the recesses. When the profile plate is so resting, the sheet is sandwiched between the plate and the grid.

Heat may then be applied to the upper side of the profile plate (i.e. the side away from the sheet), passing through the cut-outs to heat selected areas of the sheet. Because at this time the sheet does not contact the mold surface (which contact would allow the mold surface to draw heat away from the sheet), the selected areas of the sheet may be heated more uniformly. When the selected areas have been heated to forming temperature, the mold may rise; because the alignment pins rise with the mold, they lift the profile plate away from the surface of the sheet. At this time the grid is received by mold recesses so as to retract flush into the mold, thus causing the sheet to contact the mold surface and thermoforming to occur. After thermoforming and cooling of the sheet to its setting temperature, the profile plate may be removed and the mold retracted, hence allowing the sheet to be removed from the mold surface. The grid may then return to its normal, unretracted position.

In other embodiments of the invention, profile plates may include through-holes corresponding to the alignment pins, consistent with the heat sink of the Shanley, IV application. In these embodiments, tabs or other features of the clamps may hold the plate against the sheet. As the mold rises during the forming process, the alignment pins extend further through the profile plate rather than lifting the plate, although other aspects of the process may remain the same.

In yet other embodiments of the invention, alignment holes are incorporated into the mold, and the profile plate has downwardly-protruding pins. Guide bushings and springs may protrude upward from the alignment holes and support the profile plate, sheet, and grid above the mold surface. During forming, when the mold arises, the downwardly-protruding pins compress the springs and recess into the mold surface.

Persons skilled in the art will recognize that these systems of avoiding initial contract of the sheet and mold are passive, in that no actuators are required. Of course, active systems may be designed as well. Generally, however, they all seek to enhance heating of the sheet by preventing the upper surface of the mold from prematurely drawing heat away from the lower surface of the sheet.

Inserts, or plugs, for use with the invention may be redesigned relative to those of the Shanley, IV application so as to have outer diameter at least slightly larger than the outer diameter of the coins or other objects to which they correspond. A guide, or lead-in, feature additionally may be included in the plugs; one such approach adds a skirt to the plug adjacent the mold face. The skirt functions to prevent the formed part from developing a sharp corner that otherwise might catch in contact with certain coins (nickels and pennies in particular). Nicks also optionally may be added to the plugs to allow evacuation of air when sheets are formed about them, or to function as "crush ribs" allowing for a wider tolerance variance in the coins or other objects and the fit of the objects into corresponding pockets, or both to allow evacuation of air and function as crush ribs.

Non-stick material—such as but not limited to silicone tape—may be placed on the (under)side of the profile plate abutting the to-be-formed sheet. This reduces the possibility of the profile plate sticking to printing on the sheet or causing printing to transfer from the sheet to the plate. It further reduces the amount of any heat transferred from the heated plate to the printed matter.

It thus is an optional, non-exclusive object of the present invention to provide improved apparatus and methods for thermoforming products.

It is an additional optional, non-exclusive object of the present invention to provide improved apparatus and methods for selective thermoforming.

It is also an optional, non-exclusive object of the present invention to provide apparatus and methods for separating a polymeric material from a mold surface while selective areas of the polymeric material are being heated to a forming temperature.

It is a further optional, non-exclusive object of the present invention to provide supports for polymeric material that can recess into a mold surface when desired.

It is another optional, non-exclusive object of the present invention to provide improved inserts or plugs with skirts in areas adjacent a mold surface and, optionally, nicks.

It is, moreover, an optional, non-exclusive object of the present invention to provide non-stick material on undersides of profile plates to reduce transfer of printing from printed polymeric sheets to the plates and reduce transfer of heat from the plates to the sheets.

Other object, features, and advantages of the present invention will be apparent to persons appropriately skilled in the art with reference to the remaining text and the drawings of this application.

DETAILED DESCRIPTION

Figure 1:
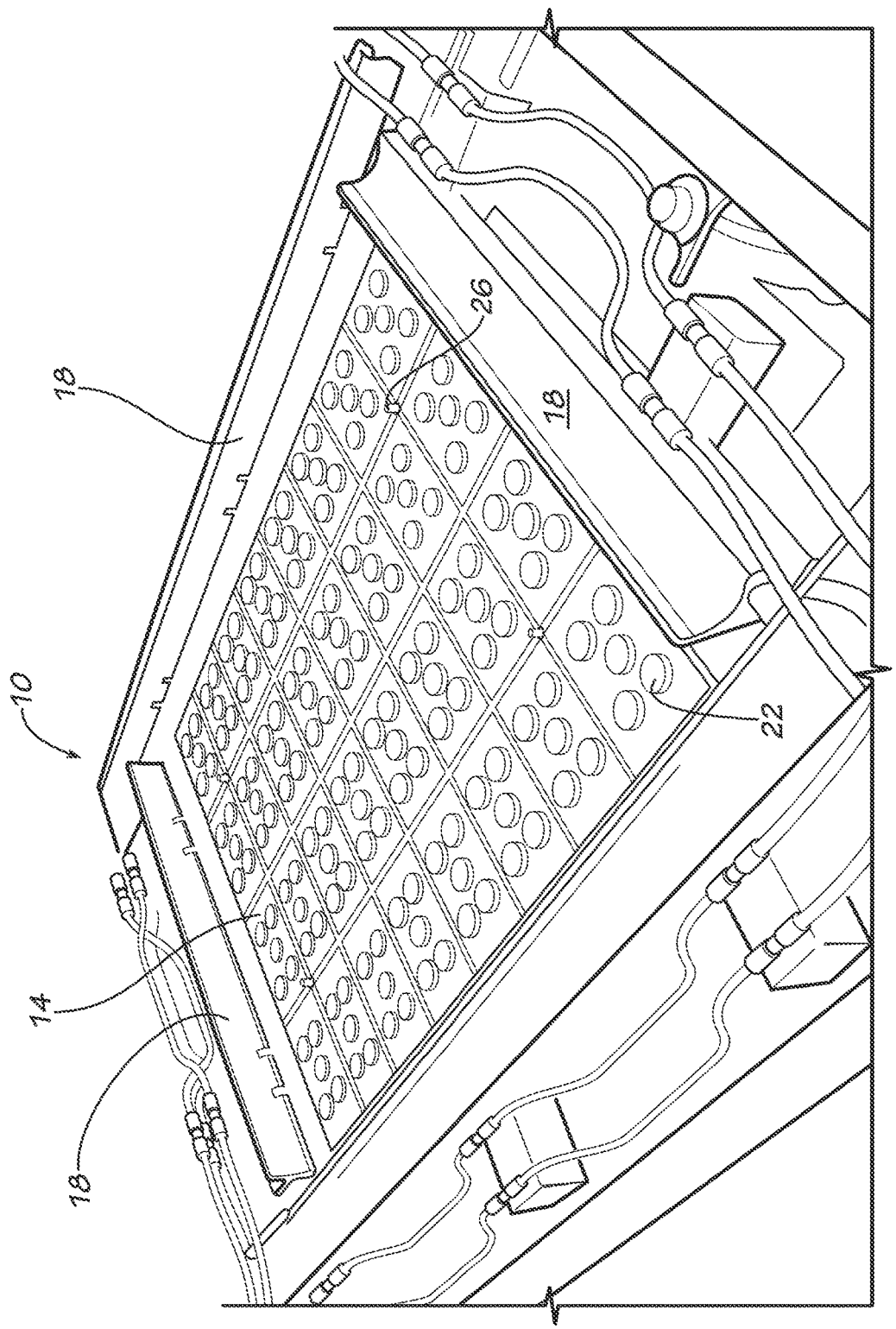
FIG. 1 is a perspective view of a mold useful with the present invention and illustrating various plugs and alignment pins protruding upward from its surface onto which a formable sheet may be placed.

Depicted in FIG. 1 are portions of a thermoforming apparatus including mold 10. Mold 10 may be similar to the mold of the Shanley, IV application and include a generally planar upper surface 14 and clamps 18. Protruding upward from upper surface 14 may be one or more plugs 22 and one or more alignment pins 26. Mold 10 preferably (but not necessarily) is made of aluminum, and plugs 22 function as three-dimensional objects about which sheets of polymer material are formed. Although not shown in FIG. 1, items such as heaters, actuators, and computerized controls also may be included as part of the thermoforming apparatus as needed. Pins 26 facilitate alignment of the to-be-formed material relative to the plugs 22.

Figure 2:
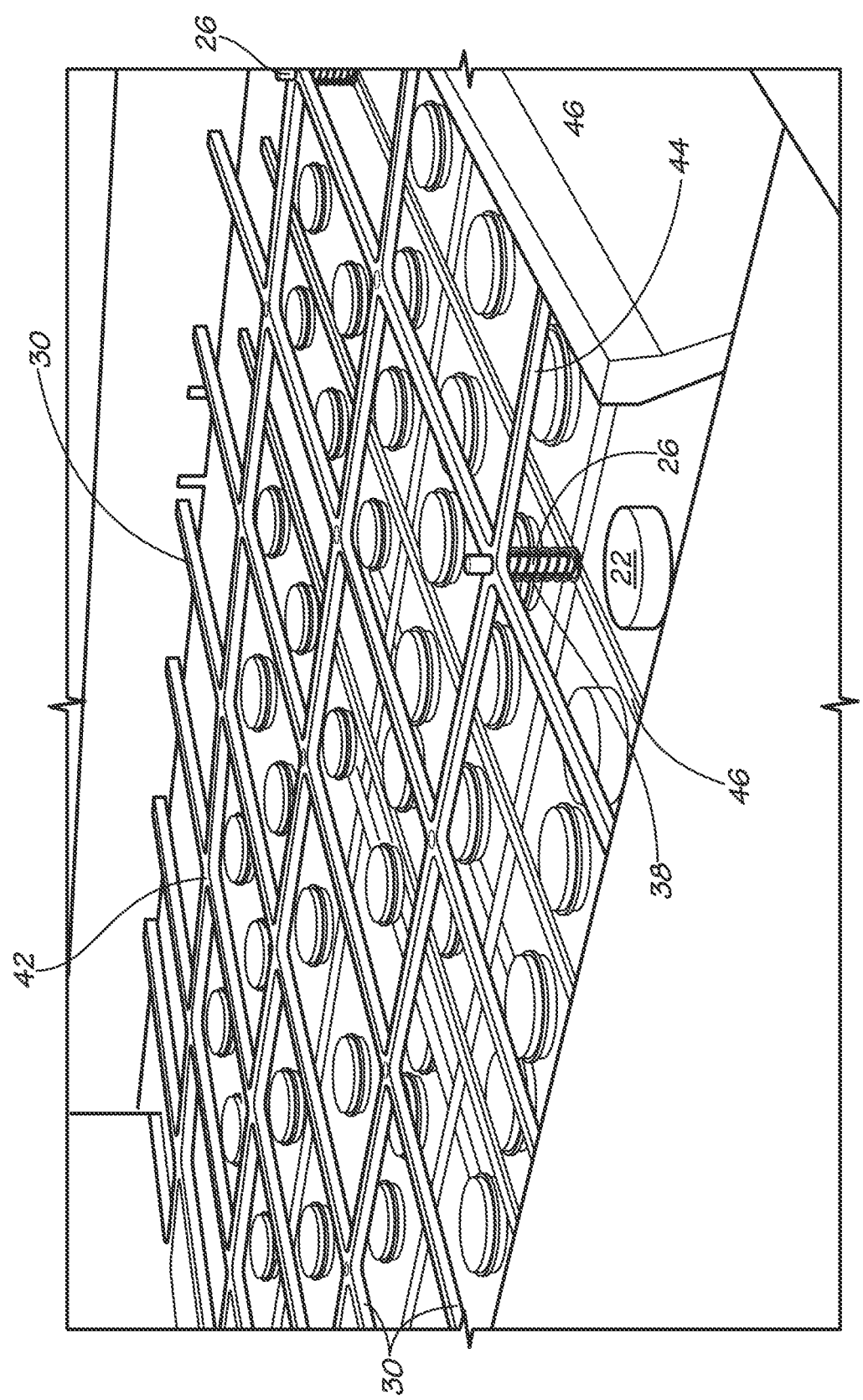
FIG. 2 is a perspective view of the mold portion of FIG. 1 together with a grid positioned on the alignment pins.
Figure 3:
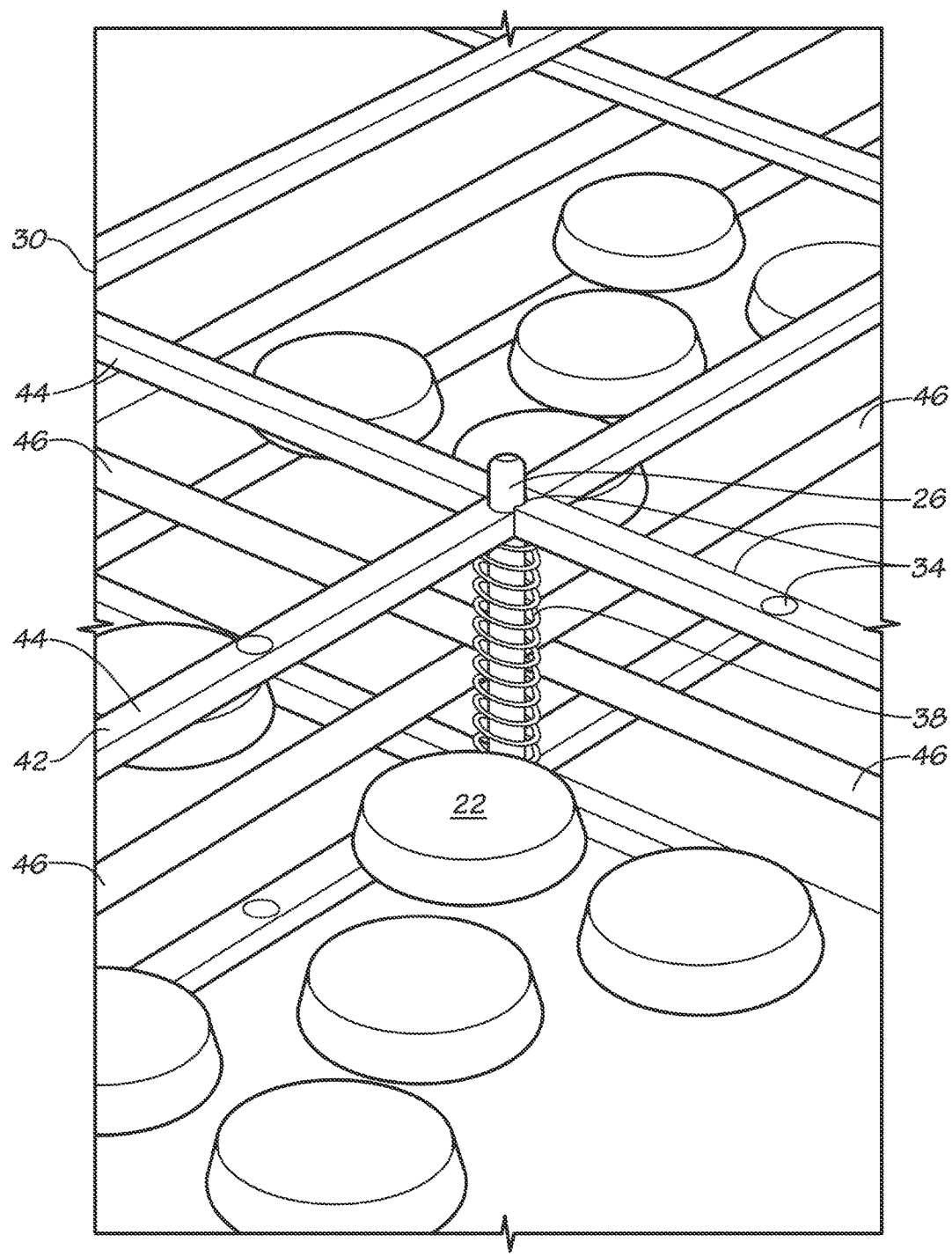
FIG. 3 is a close-up view of the mold portion and grid of FIG. 2.

FIGS. 2-3 illustrate an exemplary grid 30 of the present invention. Grid 30 forms a support rail structure for a polymeric sheet and may include one or more holes 34 configured to align with pins 26. FIGS. 2-3 also detail springs 38 positioned about (at least) the pins 26 that are aligned with holes 34; the force of the springs 38 suspends grid 30 above upper surface 14, effectively providing an air gap between the two. Placing the polymeric sheet onto the top of grid 30, i.e. onto surface 42, thereby results in separation between the sheet and the upper surface 14 until the force of springs 38 is overcome.

As shown at least in part in FIG. 2, grid 30 may comprise intersecting sets of bars 44 and have an overall size approximating the size of upper surface 14. Aluminum is a preferred material for grid 30, although other materials may be used instead. Preferably, although not necessarily, the total area of bars 44 of grid 30 is substantially less than the overall area of the grid 30. As long as grid 30 is able to prevent substantial sagging of a heated polymeric sheet, it should be satisfactory for its intended purposes.

Also detailed in FIGS. 2-3 are recesses 46 formed in upper surface 14. Recesses 46 are formed complementary to grid 30 so that bars 44 may fit in the recesses 46 when the force of springs 38 is overcome. When bars 44 of grid 30 are so fitted, the polymeric sheet previously supported thereby instead will contact upper surface 14 so as to be able to be formed about plugs 22.

Figure 4:
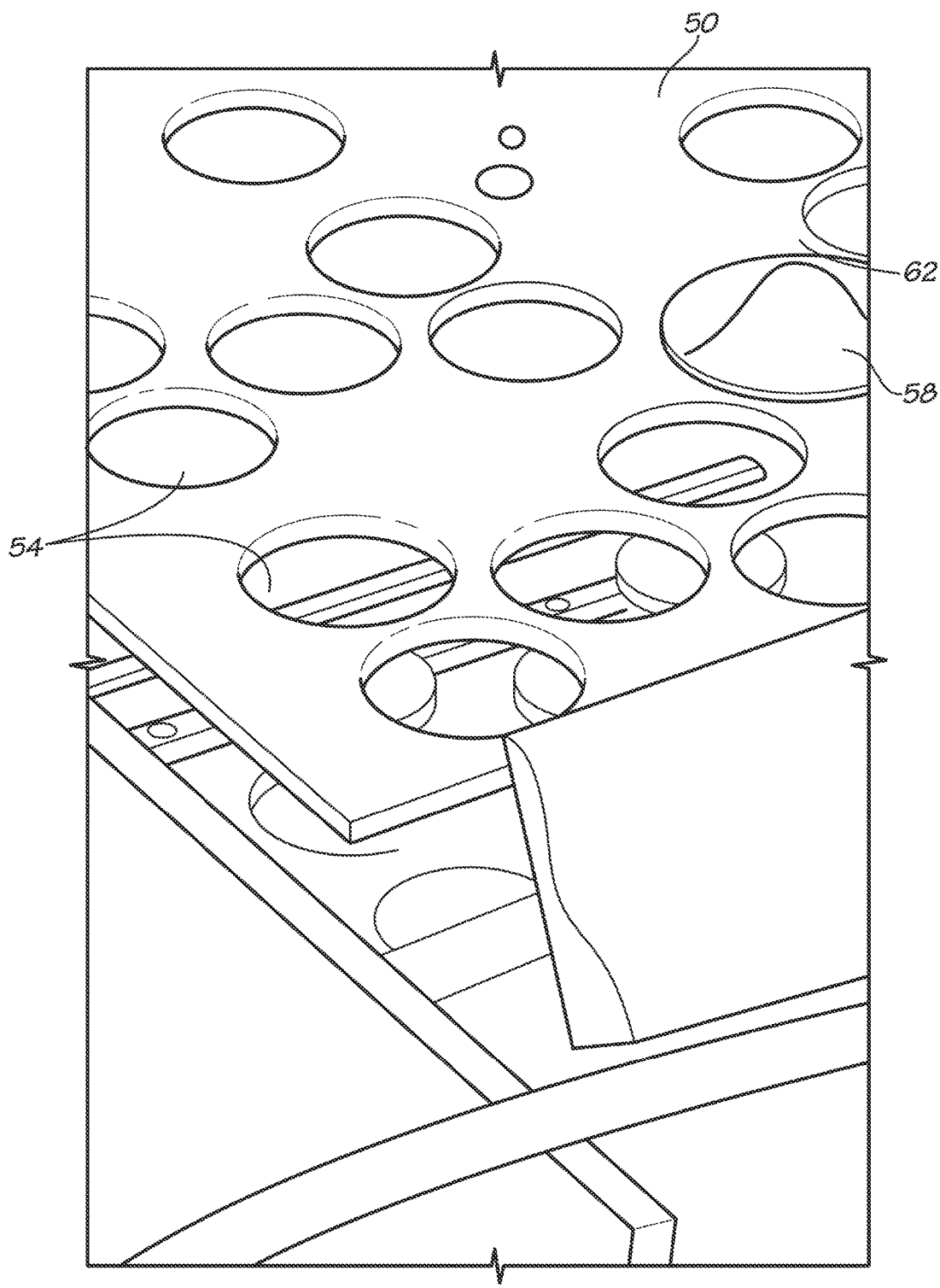
FIG. 4 is a perspective view of an exemplary profile plate of the present invention having recesses that are not through-holes.

FIG. 4 shows an exemplary profile plate 50 of the present invention. Plate 50 may generally be similar to the heat sink of the Shanley, IV application and include one or more cut-outs 54 through its depth, each of which preferably is approximately the size and shape of an associated plug 22. In an embodiment of the invention consistent with FIG. 4, however, plate 50 may omit through-holes for purposes of aligning with pins 26. Instead, it may contain downwardly-directed recesses configured to receive the pins 26, with the exterior 58 of one such recess being illustrated in FIG. 4 as protruding upward from upper surface 62 of plate 50.

Figure 5:
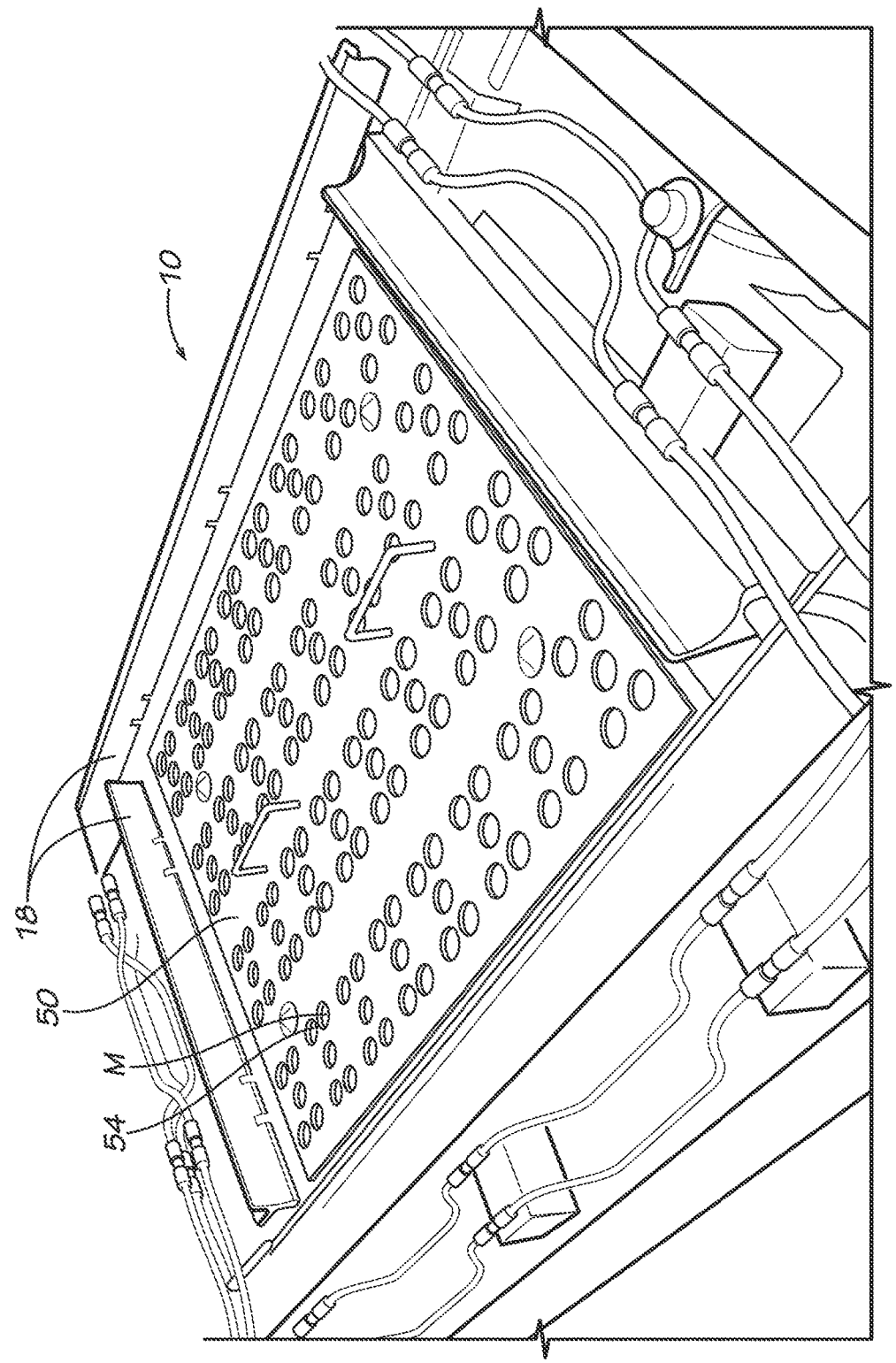
FIG. 5 is a perspective view of the profile plate of FIG. 4 positioned atop an exemplary polymeric sheet and the grid of FIGS. 2-3.
Figure 6:
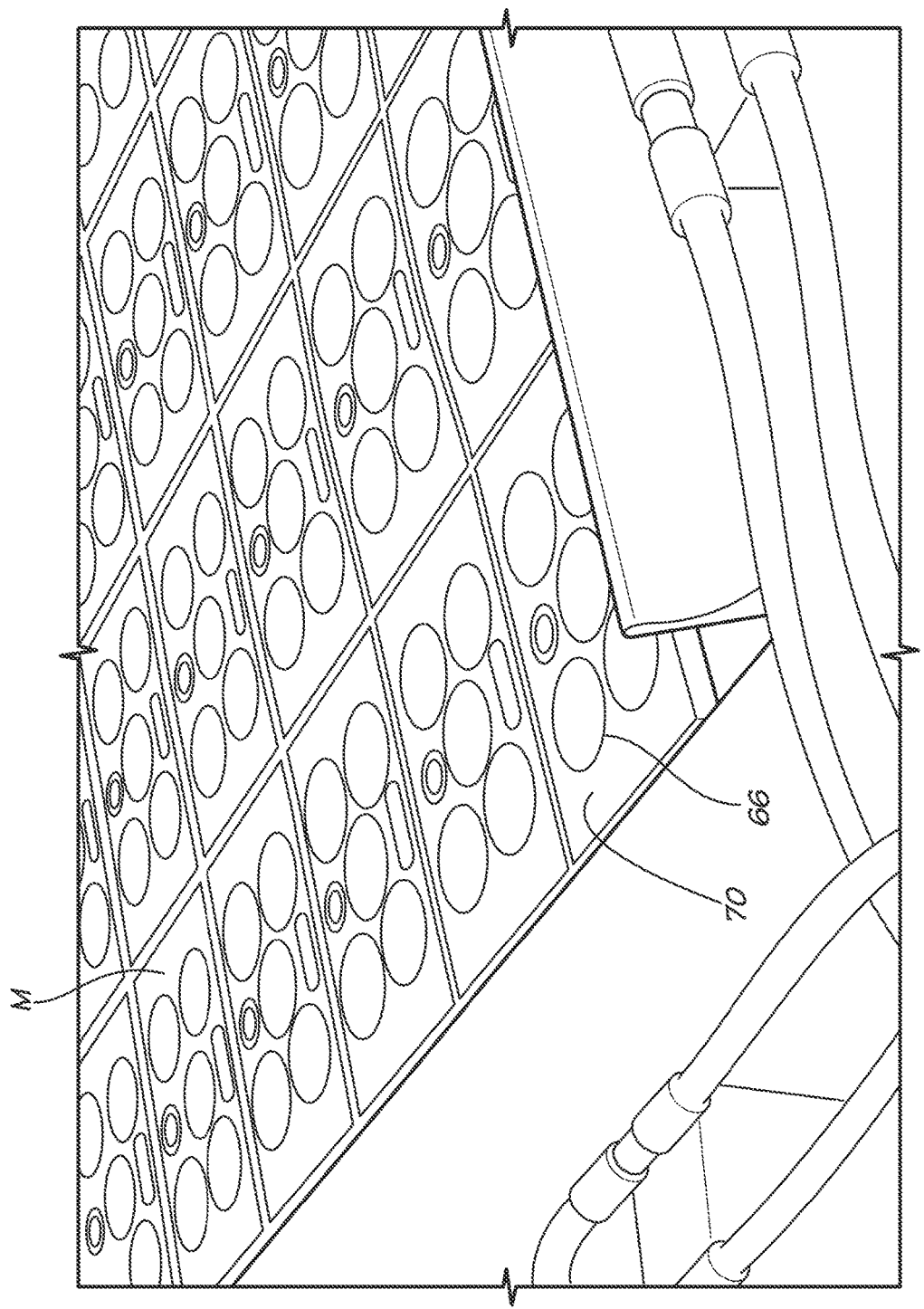
FIG. 6 is a perspective view of an exemplary polymeric sheet post-forming.

FIG. 5 illustrates relative positioning of grid 30 (albeit no longer visible in the drawing), polymeric sheet M (visible only through cut-outs 54), and profile plate 50 when the force of springs 38 is overcome. Upon this occurrence, bars 44 are fitted into recesses 46 so that grid 30 is flush with upper surface 14, sheet M contacts the upper surface 14 so as to be formed about plugs 22, and profile plate 50 remains atop the sheet M. A sample sheet M post-forming appears in FIG. 6. Like the formed sheet of the Shanley, IV application, sheet M may contain both formed portions 66 and unformed portions 70 and may be divided into multiple display holders or otherwise. Formed portions 66 typically comprise cavities for receiving coins or other objects for display, whereas unformed portions 70 typically include printed text or art work that remains undistorted notwithstanding having been subjected to elevated temperatures during the forming process. Sheet M need not necessarily have both formed and unformed portions 66 and 70, respectively, nor need it necessarily include printed text or art work.

Figure 7A:
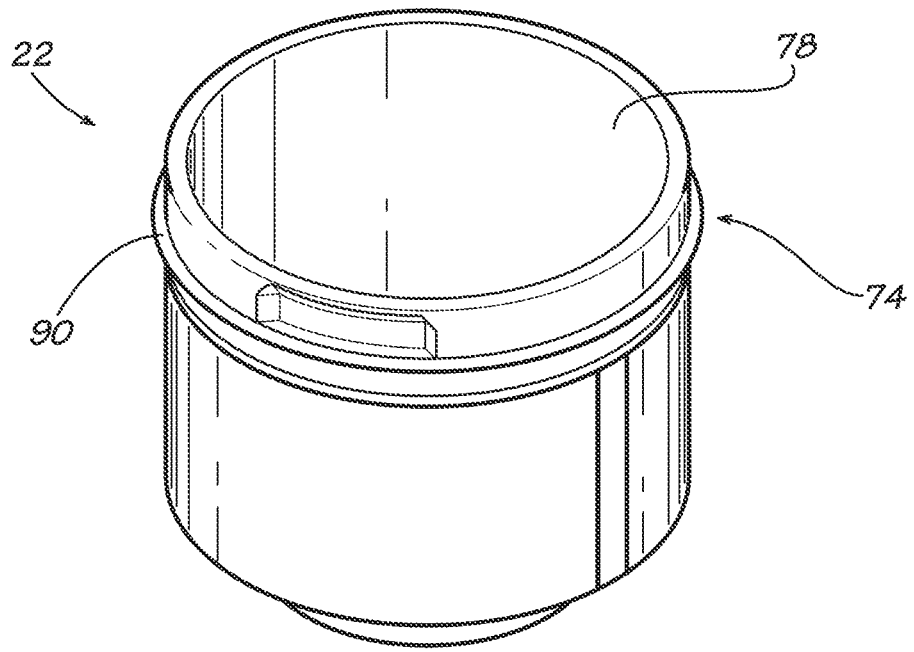
FIGS. 7A-D are various views of a plug consistent with FIG. 1.
Figure 7B:
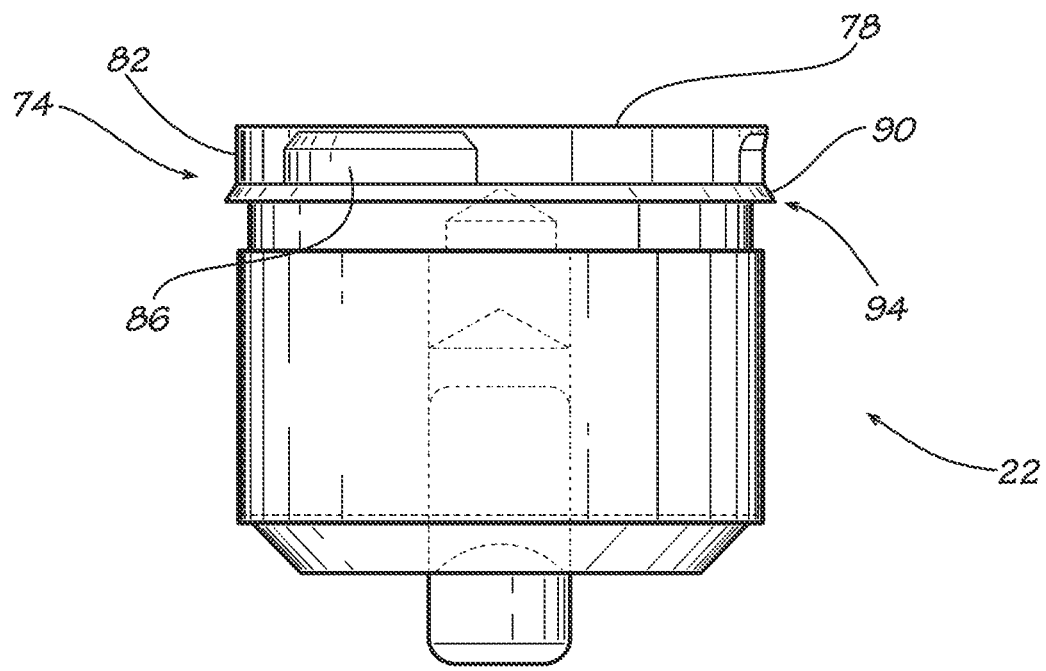
Figure 7C:
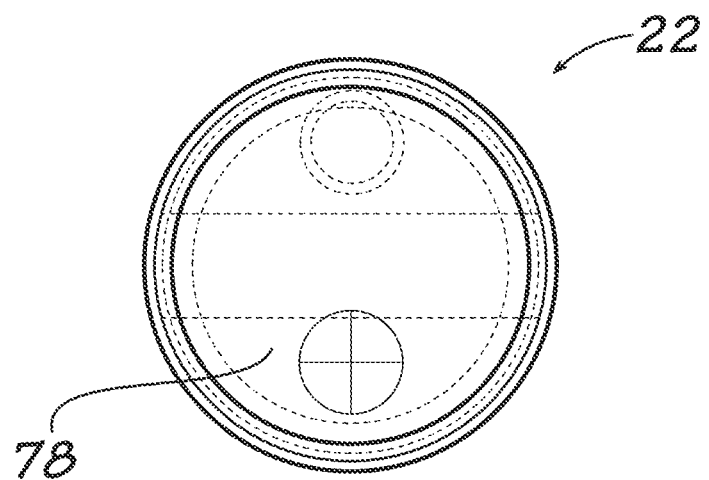
Figure 7D:
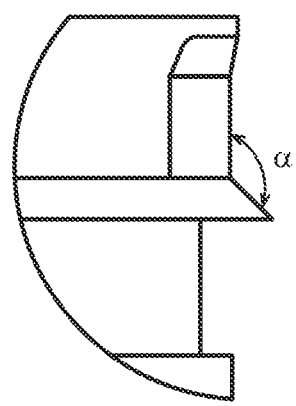

FIGS. 7A-D, finally, depict aspects of an exemplary plug 22 configured to be removably fitted into upper surface 14 of mold 10. Like the plugs of the Shanley, IV application, plug 22 may, if desired, be shaped generally as a cylinder and include section 74 comprising upper surface 78 together with side 82. Formed into side 82 may be one or more notches 86. Preferably three notches 86 are incorporated into side 82, with the notches 86 beneficially (although not necessarily) being angularly spaced evenly about the circumference of plug 22. As depicted in FIGS. 7B-D, notches 86 need not extend completely to upper surface 78—although they may do so if desired.

Detailed especially in FIGS. 7A-B and D is skirt 90 of plug 22. Skirt 90 exists about the circumference of section 74 at an end 94 of side 82 opposite upper surface 78 and forms an angle α at its intersection with side 82 of preferably (although not necessarily) approximately 135°. Effectively, skirt 90 may be a radiused extension of side 82. Existence of the skirt 90 essentially creates a controlled radius at the entry of each formed portion 66, reducing the tendency of the portion 66 to obstruct placement of a coin therein.

As noted earlier herein, variants of the inventive technology may utilize through-holes in profile plates 50 instead of recesses or swap pins, holes, and recesses between the mold and plates 50. Additional variants of plates 50 may incorporate silicone tape material (or other non-stick material) on their sides that contact the polymeric sheets to help prevent undesired transfer of heat from plates 50 to the printed surfaces of the sheets. Persons skilled in the art will recognize that yet other variants may exist consistent with the concepts described herein and that acts of the thermoforming processes not described herein may be performed in the manners described in the Shanley, IV application or otherwise as desired.

The foregoing is provided for purposes of illustrating, explaining, and describing embodiments of the present invention. Terms of direction and relative positioning (e.g. upper lower, upward, atop, etc.) are used to identify nominal or preferred, rather than absolute, relationships of components and may be modified as appropriate. Further modifications and adaptations to these embodiments will be apparent to those skilled in the art and may be made without departing from the scope or spirit of the invention.

What is claimed is:

1. Apparatus for thermoforming a plastic material, comprising:
   a. a mold;
   b. means for supporting a plastic material in a first position remote from the mold and for repositioning the plastic material to a second position adjacent the mold, the plastic material defining integral first and second regions and the supporting means comprising a grid atop which the plastic material is configured to be placed; and
   c. means for selectively heating the first region to its forming temperature while maintaining the second region at less than its forming temperature when the plastic material is in the second position.

2. Apparatus according to claim 1 in which the supporting means further comprises at least one spring for biasing the plastic material toward the first position.

3. Apparatus according to claim 2 in which the mold defines an upper surface having at least one recess therein.

4. Apparatus according to claim 3 in which the at least one recess in the upper surface of the mold is configured to receive the grid when the plastic material is in the second position.

5. Apparatus according to claim 4 in which at least one pin protrudes from the upper surface of the mold, with the at least one spring being fitted about the at least one pin.

6. Apparatus according to claim 5 in which at least one plug protrudes from the upper surface of the mold, with the at least one plug being generally cylindrical in shape and having a side about which a skirt is formed.

7. Apparatus according to claim 6 in which the skirt forms an angle of approximately 135° with the side.

8. Apparatus according to claim 1 in which the grid comprises intersecting sets of bars.

9. Apparatus according to claim 5 in which the grid comprises intersecting sets of bars having at least one hole receiving the at least one pin.

\* \* \* \* \*